Aug. 10, 1971    R. P. HAMLEN ET AL    3,598,655
METAL-AIR CELL
Filed April 1, 1968
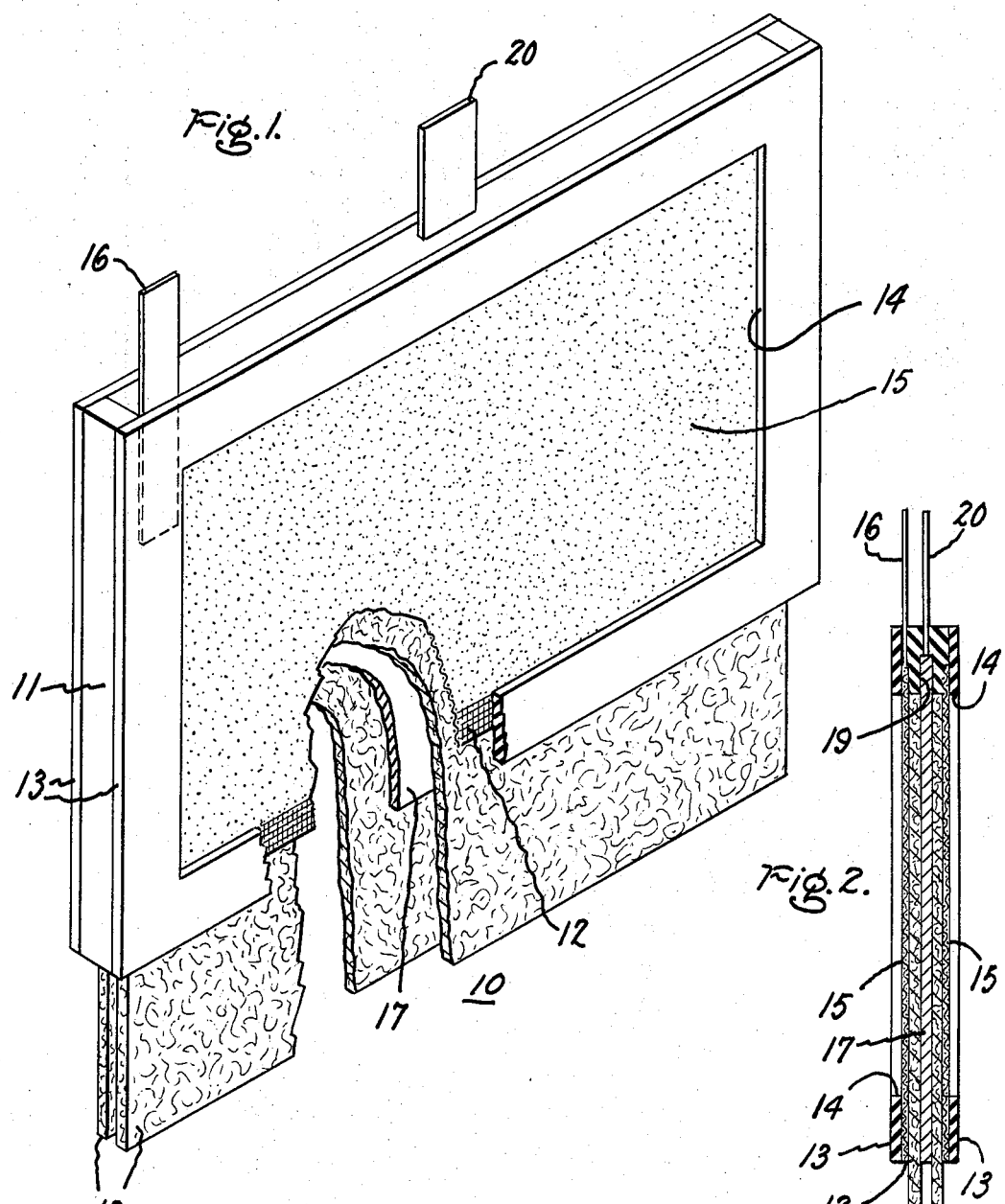
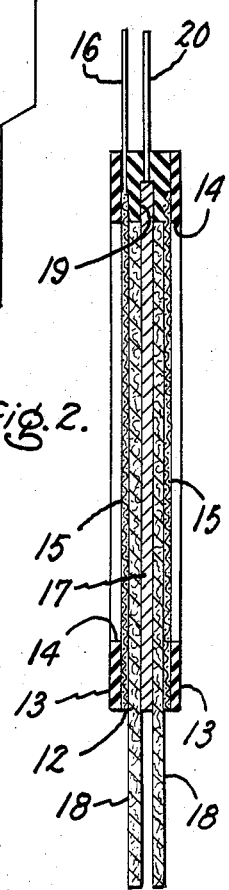
Inventors:
Robert P. Hamlen,
Elihu C. Jerabek,
by Paul R. Webb, II
Their Attorney.

united States Patent Office 3,598,655
Patented Aug. 10, 1971

---

3,598,655
METAL-AIR CELL
Robert P. Hamlen, Scotia, and Elihu C. Jerabek, Voorheesville, N.Y., assignors to General Electric Company
Filed Apr. 1, 1968, Ser. No. 717,856
Int. Cl. H01m 7/00, 29/04
U.S. Cl. 136—86                                    2 Claims

ABSTRACT OF THE DISCLOSURE

A metal-air cell has at least one cathode electrode, at least one precipitate-producing anode electrode spaced from the cathode electrode, and an absorbent electrolyte matrix positioned between and in contact with the electrodes, the matrix extending beyond one of the edges of the respective electrodes and adapted to contact a separate electrolyte source. This cell provides a structure in which a self-cleaning anode is produced by the employment of the extended matrix and separate electrolyte source.

---

This invention relates to metal-air cells and, more particularly, to metal-air cells in which an absorbent electrolyte matrix is positioned between and in contact with the electrodes, which matrix extends beyond one of the edges of the respective electrodes and adapted to contact a separate electrolyte source.

The invention herein described was made under Contract No. NOm–73503 with the United States Marine Corps, Department of the Navy.

Metal-air cells are galvanic cells which use an oxidant of oxygen or oxygen from the air as the reactive material consumed at the positive electrode of the cell. The oxygen thereby serves as the cathode depolarizer. Such cells employ a saline or alkaline electrolyte in the cell. Magnesium, zinc and aluminum are useful anode materials in such cells since they are generally low in cost and light in weight. However, during the operation of such a cell, the above type of anode material forms a precipitate or sludge which occupies a large volume of the electrolyte. When such sludge forms, the energy output drops rapidly and the utilization of the anode is diminished. It is then required to remove the sludge from the cell and replace the electrolyte therein to restore the cell to its useful operating condition.

Our present invention is directed to an improved metal air cell which substantially reduces or eliminates the sludge accumulation during operation thereby providing a self-cleaning anode electrode.

It is a primary object of our invention to reduce substantially or to eliminate the sludge accumulation in the electrolyte of the metal-air cell which sludge is produced by the anode electrode reaction.

It is another object of our invention to provide such an improved metal-air cell which will operate for a longer period of time and require less maintenance.

In accordance with our invention, a metal-air cell has at least one cathode electrode, at least one precipitate-producing anode electrode spaced from the cathode electrode, and an absorbent electrolyte matrix positioned between and in contact with the electrodes, the matrix extending beyond one of the edges of the respective electrodes and adapted to contact a separate electrolyte source.

These and various other objects, features, and advantages of the invention will be better understood from the following description taken in connection with the accompanying drawing in which:

FIG. 1 is a respective view of a metal-air cell embodying our invention; and

FIG. 2 is a vertical sectional view of the metal-air cell shown in FIG. 1.

In FIGS. 1 and 2 of the drawing, there is shown generally at 10 an improved metal-air cell embodying our invention. Cell 10 has a casing 11 in the form of an inverted U-shaped frame. On opposite outer surfaces of casing 11 a metal screen 12 is shown sealed thereto. A face piece 13 is sealed to each of the opposite surfaces of casing 11 and overlies the edges of screen 12. Each of the face pieces 13 is provided with a large opening 14 whereby the portion of screen 12 lying within open portion 14 forms a part of a gas permeable, liquid impermeable cathode electrode 15 which is co-extensive with opening 14. A terminal strip 16 is attached to screen 12 to provide an electrical connection for the cathode electrode.

While the cathode electrode 15 is shown in the above form, various types of cathodes are known in the art for employment in a metal-air cell. The type of cathode shown in FIG. 1 comprises screen 12 with a coating thereon of catalytic metal, unsupported or supported, and a binder of a suitable material, such as polytetrafluoroethylene, bonding the particles of the catalyst together and to screen 12 thereby resulting in cathode electrode 15. In such a cathode structure, the exterior faces thereof may be coated with a layer of polytetrafluoroethylene to provide water-proofing for the structures.

Another improved cathode which is suitable for employment in the present invention is described and claimed in the copending application of Paul J. Moran and Harold A. Christopher, Ser. No. 664,366, filed Aug. 30, 1967, which is assigned to the same assignee as the present application. The cathode electrode in the above-mentioned copending application has an electronically conductive grid, a hydrophobic binder, and electronically conductive, catalytically active carbon particles held together and to the grid by the binder. A commercial wet-proof carbon electrode is also suitable as the cathode.

An anode electrode 17 is positioned between and spaced from the pair of cathode electrodes 15. Such an anode is produced from a precipitate-producing material such as magnesium, zinc, aluminum or alloys of these metals. A strip of electrolyte absorbent material 18 is positioned adjacent and in contact with each opposite surface of anode electrode 17 and in contact with respective cathode electrodes 15. Such material, which can be for example in the form of felt, extends beyond the edges of the electrodes so that it can contact an electrolyte in a separate chamber. As it will be appreciated, this material which must absorb electrolyte, can be in various configurations and can be wrapped or otherwise positioned in contact with anode electrode 17 and cathodes 15.

While a pair of parallel cathode electrodes are shown spaced from the anode electrode and on opposite sides thereof, a single cathode electrode can be employed which is spaced from the anode electrode and has an absorbent electrolyte matrix positioned between the electrodes and in contact therewith, the extended portion of such electrolyte matrix is adapted to contact an electrolyte source which is separate from the metal-air cell. Additionally, a pair of anode electrodes can be employed with a single cathode electrode, or a plurality of anode electrodes and cathode electrodes can be provided.

Various electrolytes can be used. Suitable electrolytes include aqueous solutions of sodium chloride and potassium chloride for magnesium and magnesium alloys; aqueous solutions of sodium chloride, potassium chloride, and potassium hydroxide for aluminum and aluminum alloys; and aqueous solutions of potassium hydroxide and sodium hydroxide for zinc and zinc alloys. Aluminum alloys which have a small weight percent of tin appear to function well with an electrolyte of an aqueous solution of sodium chloride. Such an alloy is described, for example, in U.S. Pat. 3,189,486 issued June 15, 1965.

We have discovered that an improved metal-air cell can be constructed by employing at least one cathode electrode, at least one precipitate-producing anode electrode spaced therefrom, an absorbent electrolyte matrix positioned between the electrodes and in contact therewith, and the matrix extended beyond one of the edges of the respective electrodes and adapted to contact a separate electrolyte source. In our preferred arrangement, a pair of parallel cathode electrodes are provided in the metal-air cell and are spaced from the anode and are on opposite sides of the anode electrode. We found that such a cell is assembled as above and the matrix extension is positioned in a separate electrolyte source such as salt water.

When a load is applied across the electrodes of the cell, electrical energy is generated during which time a precipitate forms from the anode electrode. While normally this precipitate would form a sludge at the bottom of the cell and fill subsequently the cell, these problems have been eliminated by the present cell. The precipitate which forms is removed or cleaned from the anode by employing the absorbent electrolyte matrix and the separate electrolyte source. Since the electrolyte matrix extension is positioned in a separate electrolyte source, there is no collection of sludge at the bottom or in the cell since the sludge is removed into the separate electrolyte source. Thus, the cell operates efficiently for a much longer period of time and requires a minimum of maintenance. Further, the cell electrolyte is not reduced in volume since the electrolyte is contained in a separate source from the cell. In this manner, an improved metal-air cell is provided which employs lightweight and inexpensive anodes without being subjected to the disadvantage of these types of anode materials.

An example of a metal-air cell made in accordance with our invention is set forth below:

EXAMPLE 1

A metal-air cell was constructed in accordance with FIGS. 1 and 2 of the drawing. Each of the cathodes was formed of a silver screen onto which was pasted by a binder of polytetrafluoroethylene catalytic materials of nickel, platinum and palladium in a ratio of 5:1:1 of these respective materials.

The anode was an aluminum alloy metal containing a small weight percent of tin. Rayon felt was employed as the electrolyte matrix whose extensions were immersed in a 3 weight percent solution of sodium chloride in a separate container which was positioned below the cell. A load was applied across the electrodes, and the polarization behavior of the cell was measured as set forth below in Table I.

TABLE I

| Total cell voltage | Current (ma.) | Voltage, aluminum to AgCl reference |
|---|---|---|
| .37 | 600 | 1.40 |
| .75 | 500 | 1.41 |
| .86 | 400 | 1.44 |
| .99 | 300 | 1.45 |
| 1.03 | 240 | 1.45 |
| 1.08 | 180 | 1.45 |
| 1.14 | 120 | 1.45 |
| 1.19 | 90 | 1.45 |
| 1.23 | 60 | 1.46 |
| 1.30 | 30 | 1.46 |
| 1.34 | 15 | 1.46 |
| 1.47 | 1 | 1.46 |

Since the electrolyte source was separate from the cell, there was no sludge volume within the cell. The pH remained approximately constant. Subsequently, visual observation was made of the cathode electrode which did not appear to have any precipitate thereon.

In the following example, a metal-air cell, which was not made in accordance with our invention was assembled and operated.

EXAMPLE 2

A metal-air cell was employed using the cathode electrode and the anode electrode of the cell set forth above in Example 1. The cathode and anode were provided within a container in which they were positioned and which contained an electrolyte consisting of 7 weight percent sodium chloride. A load was placed across the electrodes to generate electrical energy. After operating the cell for a period of 3.5 hours, it was noted that the efficiency had decreased to about 81%. This was apparently the result of a pH increase during the operation. The volume of sludge in the electrolyte within the cell was substantial, about 9 cc./amp-hour.

While other modifications of the invention and variations thereof which may be employed within the scope of the invention have not been described, the invention is intended to include such as may be embraced within the following claims.

What we claim as new and desire to secure by U.S. Letters Patent is:

1. A metal-air cell comprising a casing, at least one cathode electrode positioned within the casing, at least one precipitate-producing anode electrode positioned within the casing and spaced from the cathode electrode, an absorbent electrolyte matrix free of electrolyte positioned between the electrodes and in contact therewith, the casing having an opening at one edge thereof, and the matrix extending an appreciable distance beyond the edges of the respective electrodes and through the casing opening outside the casing and exposed to the ambient whereby the matrix can be immersed in an electrolyte source external to the casing to supply electrolyte to the matrix.

2. In a metal-air cell as in claim 1, in which a pair of parallel cathode electrodes are spaced from the anode and are on opposite sides of the anode electrode.

References Cited

UNITED STATES PATENTS

| 2,942,053 | 6/1960 | Baldwin, Jr. et al. | 136—6 |
| 2,988,584 | 6/1961 | Peters | 136—144X |
| 3,005,943 | 10/1961 | Jaffe | 136—86X |
| 3,043,898 | 7/1962 | Miller et al. | 136—86 |
| 3,333,986 | 8/1967 | Chreitzberg et al. | 136—6 |
| 3,364,071 | 1/1968 | Kordesch | 136—86 |
| 3,403,054 | 9/1968 | Puffer et al. | 136—86 |
| 3,457,115 | 7/1969 | Kent | 136—86 |

ALLEN B. CURTIS, Primary Examiner

U.S. Cl. X.R.

136—162